UNITED STATES PATENT OFFICE.

OTTO BONHOEFFER, OF ELBERFELD, AND HUGO GUNTRUM, OF VOHWINKEL, GERMANY, ASSIGNORS TO FARBENFABRIKEN VORM. FRIEDR. BAYER & CO., OF ELBERFELD, GERMANY, A CORPORATION OF GERMANY.

PROCESS OF MAKING ACETYL CELLULOSE COMPOUNDS.

987,692.    Specification of Letters Patent.    Patented Mar. 28, 1911.

No Drawing.    Application filed July 19, 1910. Serial No. 572,737.

*To all whom it may concern:*

Be it known that we, OTTO BONHOEFFER and HUGO GUNTRUM, doctors of philosophy, chemists, citizens of the German Empire, residing at, respectively, Elberfeld and Vohwinkel, near Elberfeld, Germany, have invented new and useful Improvements in Acetyl Cellulose Compounds and Processes of Making Same, of which the following is a specification.

Our present invention relates to the manufacture and production of acetyl derivatives of cellulose which are distinguished by their solubility in acetone.

The process for their production consists in treating cellulose or parent materials such as, hydrocellulose, oxycellulose, etc., with acetylizing agents, such as acetic acid anhydrid, acetyl chlorid, etc., with the addition of acid sulfates (primary sulfates) of primary aromatic amins, such as anilin bisulfate, etc.

They are whitish granular powders soluble in acetone, a mixture of acetic ester with alcohol (4:1), a mixture of chloroform with alcohol and a mixture of nitrobenzene with alcohol.

In order to illustrate the new process more fully the following example is given, the parts being by weight:—80 parts of ortho-toluidin bisulfate are introduced into a mixture of 1200 parts of glacial acetic acid and 1000 parts of acetic acid anhydrid. By heating the mixture to about 30° C. most of the bisulfate enters into solution. Subsequently 200 parts of cellulose are added. The cellulose slowly softens and is totally dissolved after some hours. The resulting solution possesses great viscosity. It is then further stirred at a temperature below 70° C. until the acetyl-cellulose is soluble in acetone. To see when this point is reached a sample of the mixture is treated with water, the precipitate is filtered off, washed, dried and dissolved in acetone. When on repeated testing a solution is obtained, water is added to the whole mass and the precipitated acetyl-cellulose is isolated in the usual way. It is a whitish granular powder soluble in acetone, a mixture of acetic ester with alcohol (4:1), a mixture of chloroform with alcohol and a mixture of nitrobenzene with alcohol.

We claim:—

1. The process for producing acetyl compounds of cellulose, which process consists in treating cellulose compounds with acetylizing agents in the presence of acid sulfates of primary aromatic amins, substantially as described.

2. The process for producing an acetyl compound of cellulose, which process consists in treating cellulose with acetic acid anhydrid in the presence of ortho-toluidin-bisulfate, substantially as described.

In testimony whereof we have hereunto set our hands in the presence of two subscribing witnesses.

OTTO BONHOEFFER. [L. S.]
HUGO GUNTRUM. [L. S.]

Witnesses:
CHAS. J. WRIGHT,
ALFRED HENKEL.